United States Patent [19]

Kawakubo et al.

[11] E Re. 29,323

[45] Reissued July 26, 1977

[54] ELECTROPHOTOGRAPHIC COPYING APPARATUS

[75] Inventors: Kazuo Kawakubo, Kawasaki; Motoharu Fujii, Tokyo; Masao Ariga, Kawasaki, all of Japan

[73] Assignee: Canon Kabushiki Kaisha, Tokyo, Japan

[21] Appl. No.: 597,906

[22] Filed: July 21, 1975

Related U.S. Patent Documents

Reissue of:

[64] Patent No.: 3,770,345
Issued: Nov. 6, 1973
Appl. No.: 20,210
Filed: Mar. 17, 1970

[30] Foreign Application Priority Data

Apr. 16, 1969 Japan ..... 44-28971
Mar. 21, 1969 Japan ..... 44-21214

[51] Int. Cl.[2] ..... G03G 15/00

[52] U.S. Cl. ..... 355/3 R; 355/3 DD; 355/11; 355/14; 355/15; 271/DIG. 2

[58] Field of Search ..... 355/3 R, 3 DR, 3 TR, 355/3 DD, 10, 11, 12, 14, 15, 16; 74/125; 271/DIG. 2

[56] References Cited

U.S. PATENT DOCUMENTS

| | | | |
|---|---|---|---|
| 2,959,153 | 11/1960 | Hider | 355/15 X |
| 3,131,570 | 5/1964 | White | 74/125 |
| 3,139,763 | 7/1964 | Lisinski | 74/125 |
| 3,251,706 | 5/1966 | Walkup | 355/3 |
| 3,318,213 | 5/1967 | Kowalski | 355/14 |
| 3,332,328 | 7/1967 | Roth, Jr. | 355/3 |
| 3,375,806 | 4/1968 | Nost | 355/3 X |
| 3,389,635 | 6/1968 | Teutsch | 355/14 X |
| 3,438,706 | 4/1969 | Tanaka et al. | 355/8 |
| 3,438,706 | 4/1969 | Tanaka et al. | 355/11 |
| 3,441,345 | 4/1969 | Kolibas | 355/14 X |
| 3,475,093 | 10/1969 | Mazzio et al. | 355/3 |
| 3,484,163 | 12/1969 | Eichorn et al. | 355/3 DR |
| 3,484,164 | 12/1969 | Byland | 355/14 |
| 3,517,994 | 6/1970 | Leedom | 355/16 |
| 3,684,363 | 8/1972 | Ito et al. | 355/3 |
| 3,684,367 | 8/1972 | Vassitch | 355/11 |
| 3,770,348 | 11/1973 | Martin | 355/11 |

*Primary Examiner*—L. T. Hix
*Assistant Examiner*—J. A. LaBarre
*Attorney, Agent, or Firm*—Fitzpatrick, Cella, Harper & Scinto

[57] ABSTRACT

An electrophotographic copying apparatus having a photosensitive drum is provided with an assembly for feeding transfer material, an image transfer roller, and a fixing assembly all located upwardly of the drum, while a brush developer assembly, whole-surface exposure lamp, primary charging and contemporaneous secondary-charging exposure electrodes, and cleaning assembly are provided generally downwardly of the drum. The transfer roller and cleaning assembly are mounted on a movable frame structure which when moved away from a central frame structure permits access to and removal of the drum. A transport mechanism for an original has an adjustable path selector for recirculating an original upon insertion and expelling the original after the second traverse. The number of traverses is determined by a rotary cam. A dust-proof chamber encloses a completely independent optical assembly for projecting the image from the original onto the drum. The brush developer assembly has an adjustable cam controlled drive for a developer feed roller which supplies a fur brush transfer roller. The cleaning assembly includes a longitudinally fluted roller for wiping the drum and an axially oriented brush for cleaning the fluted roller.

53 Claims, 16 Drawing Figures

ELECTROPHOTOGRAPHIC COPYING APPARATUS

Matter enclosed in heavy brackets [ ] appears in the original patent but forms no part of this reissue specification; matter printed in italics indicates the additions made by reissue.

The present invention relates to an electrophotographic copying apparatus and more particularly an electrophotographic copying apparatus suited for use as a business machine.

In the conventional photocopying machine used for example in a bank, an original such as a promissory note to be reproduced is first copied on a silver halide photographic film and then copies are made from this film on copying material such as paper by an electrophotographic process which is generally a Xerographic process. That is, a corona discharge is uniformly applied to an electrophotographic photosensitive member having a photoconductive layer upon an electrically conductive base or support so that the photosensitive member becomes sensitive to light or radiation. Light or radiation of a pattern corresponding to the light-dark areas of the original to be reproduced is projected upon the photosensitive member, thereby forming an electrostatic latent image corresponding to the pattern of the original by dissipating the charge in the exposed area. Thereafter, the latent image is developed by a developer of particles having a polarity opposite to that of the latent image and the developed image is transferred to a transfer sheet or support and fixed thereby providing a copy.

The conventional electrophotographic machine of the character described above has some disadvantages. First, the original to be reproduced must be copied twice. The photocopying machine becomes inevitably complex in construction, bulky in size, expensive to manufacture and very slow in operation. The conventional photocopying machine therefore cannot meet the demand of high-speed operation. The Xerographic process is widely used in the art in which case the surface of the photosensitive layer tends to be worn and abraded mechanically by the repetitive use, thus creating the problem of durability. Thus, the copying cost is inevitably increased.

The present invention therefore contemplates to eliminate the defects encountered in the prior art photocopying machine and to reproduce automatically, economical copies at high speed from an original to be reproduced such as a promissory note handled in the banks.

More specifically, the present invention provides a novel electrophotographic apparatus compact in size, light in weight, simple in operation yet highly reliable and capable of high-speed operation, based upon a novel electrophotographic process disclosed in the copending patent application Ser. No. 571,538 and Ser. No. 563,899. In short, the above novel electrophotographic process comprises the steps of imparting a charge uniformly upon a photosensitive member consisting of a base or support, a photoconductive layer and an insulating layer laminated in the order named, projecting a light image of an original to be reproduced upon the surface of the photosensitive member contemporaneously with a second charge having the polarity opposite to that of the first charge or with AC corona discharge being imparted to the photosensitive member (this step will be referred to as "contemporaneous second charge application-exposure" in this disclosure), and exposing to unpatterned light or radiation over the whole surface of the photoconductive layer [is] *if* required (this step will be referred to as "whole-surface exposure"), thereby forming an electrostatic latent image having high contrast. The electrophotographic apparatus of the type described above can directly reproduce an image of an original upon a transfer paper sheet or the like.

The broad object of the present invention is therefore to provide an electrophotographic copying apparatus.

Another object of the present invention is to provide an electrophotographic copying apparatus compact in size and light in weight suited for use as a business machine.

A further object of the present invention is to provide an electrophotographic copying apparatus which can reproduce an image of an original upon an ordinary paper sheet at high speed.

A further object of the present invention is to provide an electrophotographic copying apparatus in which an optical system is enclosed in an independent, dustproof chamber, thereby eliminating the contamination of the optical system by the toner and the dust.

A further object of the present invention is to provide an electrophotographic copying apparatus in which a transfer sheet may be firmly and smoothly separated from a photosensitive member.

A further object of the present invention is to provide an electrophotographic copying apparatus whose developing station or device may be readily inspected and repaired if required.

A further object of the present invention is to provide an electrophotographic copying apparatus in which the amount of toner supply may be adjusted [arbitarily,] *arbitrarily,* thereby preventing the formation of fog.

A further object of the present invention is to provide an electrophotographic copying apparatus whose various processing stations arranged along the periphery of a photosensitive rotary drum may be readily inspected.

The above and other objects, features and advantages of the present invention will become more apparent from the following description of one illustrative embodiment thereof taken in conjunction with the accompanying drawing in which.

Figure 1:
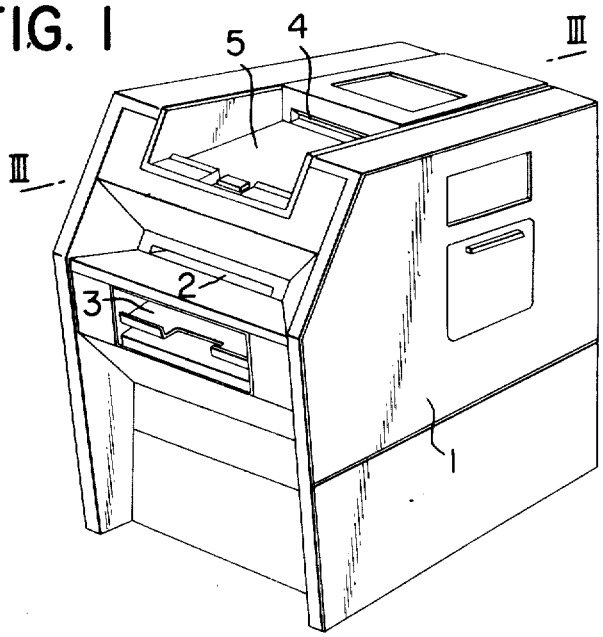
FIG. 1 is a perspective view of an electrophotographic copying apparatus in accordance with the present invention.

FIG. 1 is a perspective view of an electrophotocopying machine in accordance with the present invention. A housing or casing is designated by reference numeral 1; an original inlet, by 2; an original receiver, by 3; a copy paper outlet, by 4; and a copy paper receiver, by 5. The original to be reproduced is inserted into the original inlet 2 and returned to the original receiver 3 after processing while the copies are discharged onto the copy receiver 5 through the copy outlet 4.

Figure 3:
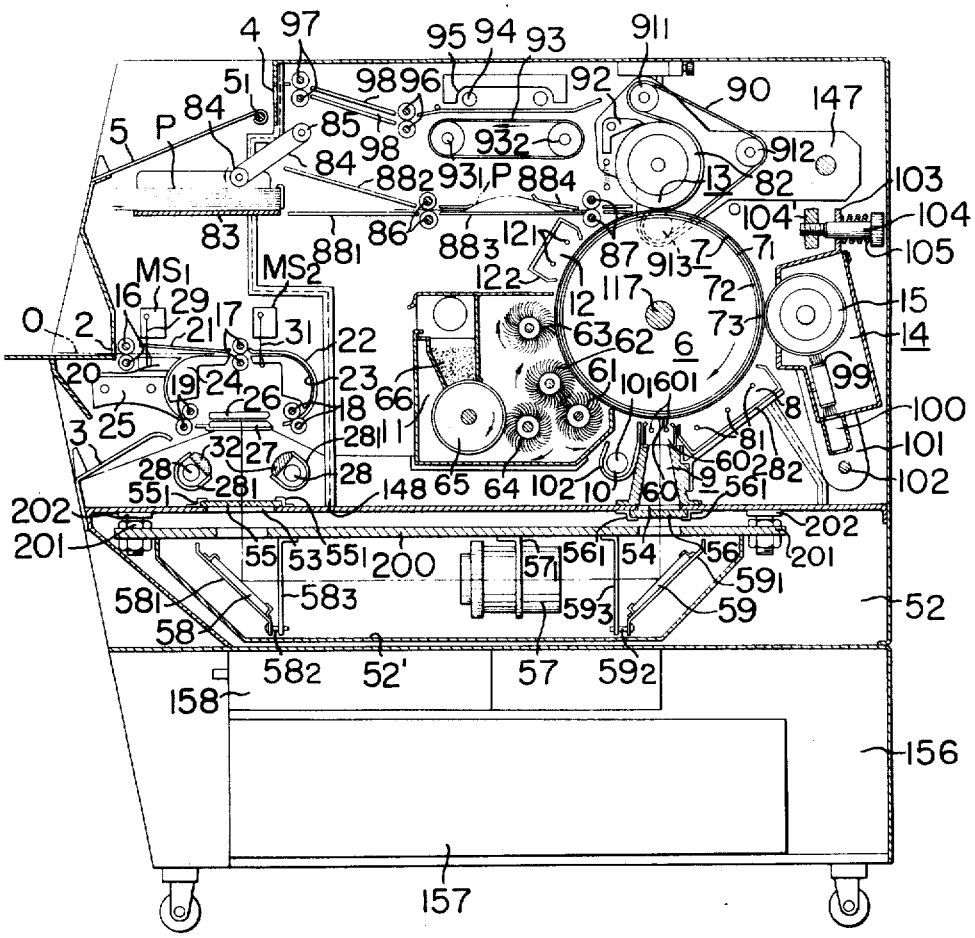
FIG. 3 is a longitudinal sectional view taken along the line III—III of FIG. 1.

FIG. 3 is a sectional view taken along the line III—III of FIG. 1. A photosensitive drum assembly comprises a rotary drum 6 and photosensitive member 7 affixed thereto and comprised of a conductive or insulating base layer 7-1, a photoconductive layer 7-2 and an insulating layer 7-3 laminated in the order named upon the rotary drum 6. The base layer 7-1 or the surface insulating layer 7-3 must transmit light or radiation therethrough so that the photoconductive layer 7-2 can respond to the light or radiation. The photosensitive drum assembly is driven in the direction indicated by the arrow about a shaft 117 drivingly coupled to a power source. Along the photosensitive drum assembly are disposed a primary charger 8, a contemporaneous charging-exposure station 9, a whole-surface exposure station 10, a developing station 11, a tertiary charger 12, a transfer station 13 and a cleaning station 14. These processing stations will be described in more detail hereinafter.

Primary Charger

The primary charger 8 comprises a corona discharging electrode 8-1 and a conductive shield 8-2 surrounding the electrode 8-1, which is electrically connected to a DC not shown by a lead wire not shown. A DC corona discharge is imparted by the primary charger 8 to the surface of the photosensitive drum assembly so that the surface may be uniformly charged positively or negatively.

Contemporaneous Charging-Exposure Station

The contemporaneous charging-exposure section 9 includes a secondary charging-exposure corona discharging device 60 comprising a corona discharging electrode 60-1 and a shield 60-2 surrounding the electrode 60-1 so as to define optically an opening for transmission of light or radiation at the upper portion of the shield 60-2. For example, the upper portion of the shield 60-2 may be physically open or may be shielded by a transparent material such as NESA glass, etc. The corona discharge electrode 60-1 is electrically connected through a lead wire to a DC or AC source not shown. In this station 9, the AC or DC corona discharge with the polarity opposite to that of the charge imparted by the primary charger 8 is imparted to the sensitized drum assembly and at the same time the light or radiation pattern of an original to be reproduced is projected upon the photosensitive drum assembly, thereby forming thereupon an electrostatic latent image.

Whole-Surface Exposure Station

This station includes a light source 10-1 such as a fluorescent lamp and a shield 10-2 for partially shielding the light source 10-1. In this station, the photoconductive layer 7-2 is uniformly illuminated by the light or radiation so that the force of the electrostatic latent image acting as an external field is increased, thereby producing a high contrast electrostatic latent image upon [thee] *the* photosensitive drum assembly. It should be noted that this process is not necessarily required so that this station 10 may be eliminated as needs demand.

The electrostatic latent image thus formed is developed in the developing station 11 to be described in more detail hereinafter. For example in order to develop an electrostatic latent image produced by primary charging, contemporaneous AC secondary charging-exposure and whole-surface exposure described hereinabove, a powder image is produced by applying toner having a polarity opposite to that of the electrostatic latent image by a fur-brush or magnet brush development process. It is noted that other developing methods an apparatus therefor may be of course employed as needs demand.

The powder image thus formed is charged by the tertiary charger 12 so that the visible powder image upon the photosensitive drum assembly may be effectively transferred to a transfer or support material such as paper P. Next the visible toner image is transferred in the transfer station 13 to the paper P electrostatically. The residual toner upon the photosensitive drum assembly may be removed by the cleaning station 14 including the roller 15.

In addition to the peripheral equipment 8 to 15 described hereinabove, an original transporting station, an optical system for exposure or light or radiation image projection, a [tranfer] *transfer* paper feeding system, fixing station, etc. are arranged along the periphery of the photosensitive drum assembly. These peripheral components in accordance with the present invention have novel features respectively, which will be described in more detail hereinafter.

Original Transporting Station

The original transportation station or system includes conveyor rollers 16, 17, 18 and 19 for transporting the original to be reproduced and fed into the original inlet 2 (See FIGS. 3 and 4), guide plates 20, 21, 22, 23 and 24, an original transportation direction changing plate 25, an exposure section consisting of members 26 and 27 (the latter being a light or radiation image transmitting member such as a plate glass), an illumination light source 28 and control switch MS-1 and MS-2. The original to be reproduced 0 such as a promissory note is inserted into the original inlet 2 with the face of the original being directed upwardly and is transported by the rollers 16 and 16 rotating in the directions indicated by the arrows, thereby pushing an actuating member 29 of the control switch MS-1, which actuates a control unit generally designated by 30 in FIG. 7 connected to the photosensitive drum assembly and its drum 6. Thus, the whole photocopying machine is actuated.

Thereafter, the original 0 being transported by the conveyor or feed rolls 17 and 17 pushes an actuating member 31 of the control switch MS-2 which in turn actuates the original transportation direction changing member 25, as will be discussed in more detail hereinafter, so as to control the repetitive copying cycles of the same original to be reproduced. The original 0 is further advanced and directed by the feed rollers 18 so as to be placed in the slit exposure section which comprises a transparent plate glass 27 and a guide plate 26 spaced apart from other so as to permit the movement of the original 0 therebetween. The light source 28 is disposed below the plate glass 27 so that the light emanating therefrom is condensed at the slit exposure, portion upon the transparent glass 27 through the cylindrical lens 32. The light source 28 is shielded by a shield 28-1.

From the slit exposure section, the original 0 is advanced by the feed rollers 19. In this case, when the guide plate 25 is in the position indicated by the broken lines in FIG. 4, the original 0 is directed toward the original receiver 3 while when the guide plate 25 is in the position indicated by the solid lines in FIGS. 3 and 4, the direction of movement of the original 0 is so changed that it may be returned to the original transportion station for re-circulation. In this case the control switch MS-2 is again actuated by the re-circulating original 0.

More specifically when it is desired to transfer two identical images of the original 0 to the paper P, the original 0 passes through the exposure section twice. The number of recirculations of the original 0 is controlled by the control switch MS-2 and the guide plate control unit shown in FIGS. 5 and 6. The direction guide plate 25 is switched by the control unit from the position indicated by the broken line in FIG. 4 in response to the first actuation of the control switch MS-2 to the position indicated by the solid lines. Therefore, the discharge of the original 0 from the original transportation station is prevented and the original 0 is recirculated. In response to the next signal, the direction guide plate 25 is switched to the original position so that the original 0 is returned to the original receiver 3.

Figure 5:
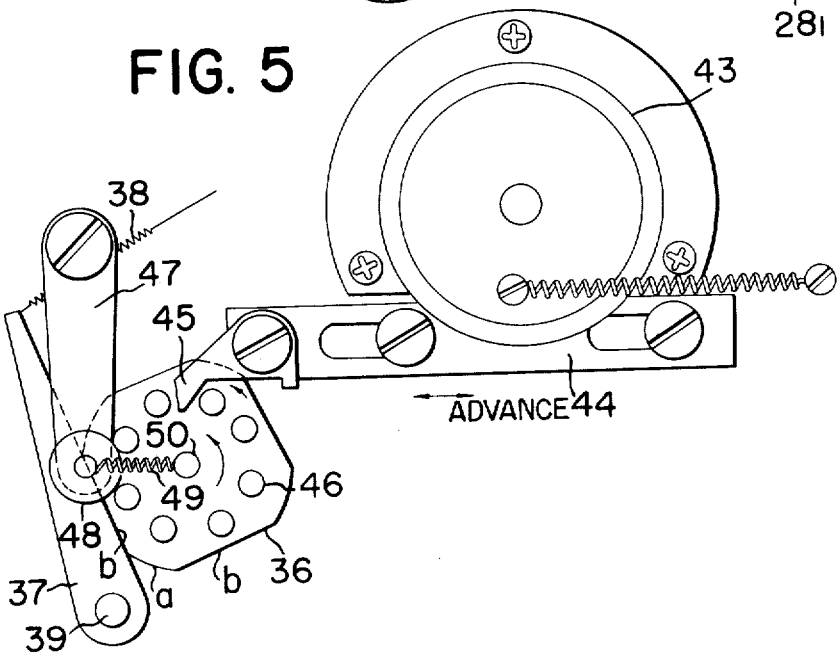
FIG. 5 is a front view of the sheet-shaped original circulation mechanism of FIG. 1.
Figure 6:
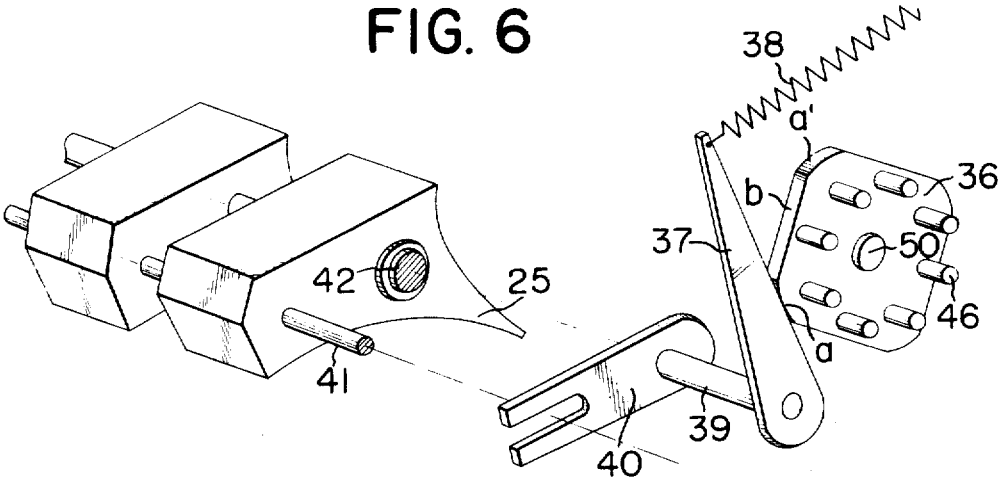
FIG. 6 is a perspective view thereof.

The above described switching of the original between discharge and re-circulation is effected by the control unit or mechanism shown in FIGS. 5 and 6. A cam 36 has a plurality of pins 46 extending therefrom and rotates about a shaft 50. Cam surfaces are designated by $a_1'$, b and a; a cam follower, by 37; a spring for biasing in the clockwise direction the actuating member 37 about its shaft 39, by 38; a bifurcated lever carried by the shaft 39, by 40; and a pin loosely fitted into the bifurcated portion of the lever 40 and fixed to the guide plate 25, by 41. The guide plates 25 carried by a shaft 42 is rocked about the shaft 42 by the cam 36.

Elements or parts for driving the cam 36 are a rotary solenoid 43, a sliding lever 44 coupled to the solenoid 43 through a pinion or the like for driven reciprocal movement, and a pawl 45 fixed to the free end of the sliding lever 44 by means of a screw or the like. Upon movement (to the left side of FIG. 5) of the sliding lever 44, the pawl 45 pushes the pin 46 of the cam 36 so as to rotate it in the counterclockwise direction. Reference numerals 47, 48 and 49 designate a detent for the cam 36.

Figure 4:
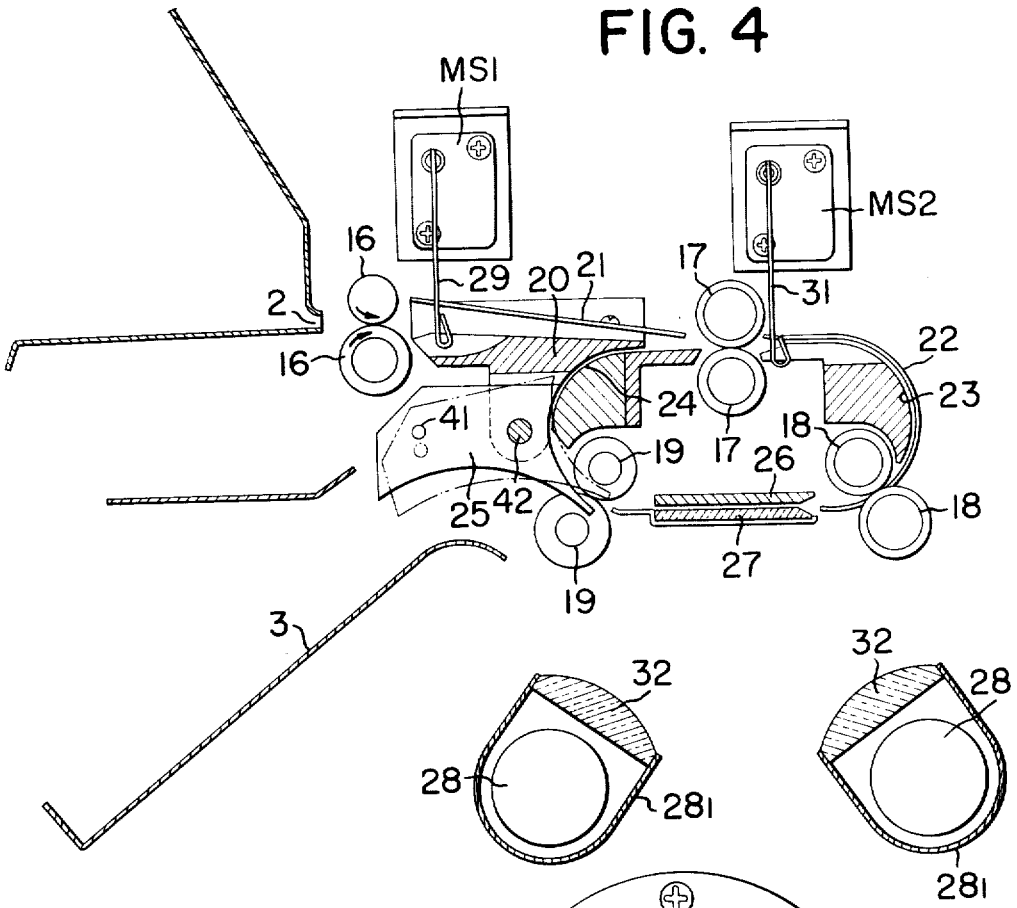
FIG. 4 is a detailed view illustrating a sheet-shaped original feed system.

When the photocopying machine is de-energized, the cam surface a of the cam 36, which is a high surface among the three cam surfaces a, a' and b, pushes the cam follower 37 against the spring 38 so that the original guide plate 25 is caused to rotate in the counterclockwise direction about the shaft 42 through the bifurcated lever 40, and the pin 41, whereby the original guide plate 25 is located in the position indicated by the broken lines in FIG. 4. Therefore, the original 0 is discharged upon the original receiver 3 through the feed rollers 19.

Upon actuation of the control switch MS-2 by the original 0 inserted from the inlet 2, the rotary solenoid 43 in FIG. 5 is actuated so that the sliding lever 44 makes one reciprocal movement. In the advancing stroke, the pawl 45 pushes the pin 46 so as to rotate the cam 36 in the counter-clockwise direction. When the cam surface a of the cam 36 is moved away from the cam follower 37, the rotation of the cam 36 is accelerated to the position determined by the detent 47, 48 and 49 and the lower cam surface b comes in contact with the follower 37 as shown in FIG. 5. That is, the cam follower 37 is rotated in the clockwise direction through a small angle so that the original guide plate 25 is rotated also in the clockwise direction to the position indicated by the [solenoid] *solid* line in FIG. 4. Consequently, the original 0 from the feed rollers 19 is directed by the original guide plate 25 for recirculation.

When the re-circulated original 0 actuates the control switch MS-2 again, the rotary solenoid 43 is energized again so that the sliding lever 44 makes one more reciprocal movement. In this case, the cam follower 37 is caused to rotate the counterclockwise direction by the cam surface a of the cam 36 so that the original guide plate 25 is returned to the position indicated by the broken lines, whereby the original 0 is returned to the original receiver 3.

In the instant embodiment, it has been so far described that the original 0 is circulated twice, but it will be understood that when the cam profile of the cam 36 is so selected to have the surfaces a, b, b and a in the order named in the direction of rotation of the cam 36, the original may be circulated three times automatically. It is therefore understood that by the provision of various cams each having a suitable cam profile so as to circulate the original by a predetermined number, the number of copies desired may be selected.

Optical Exposure System

Figure 2:
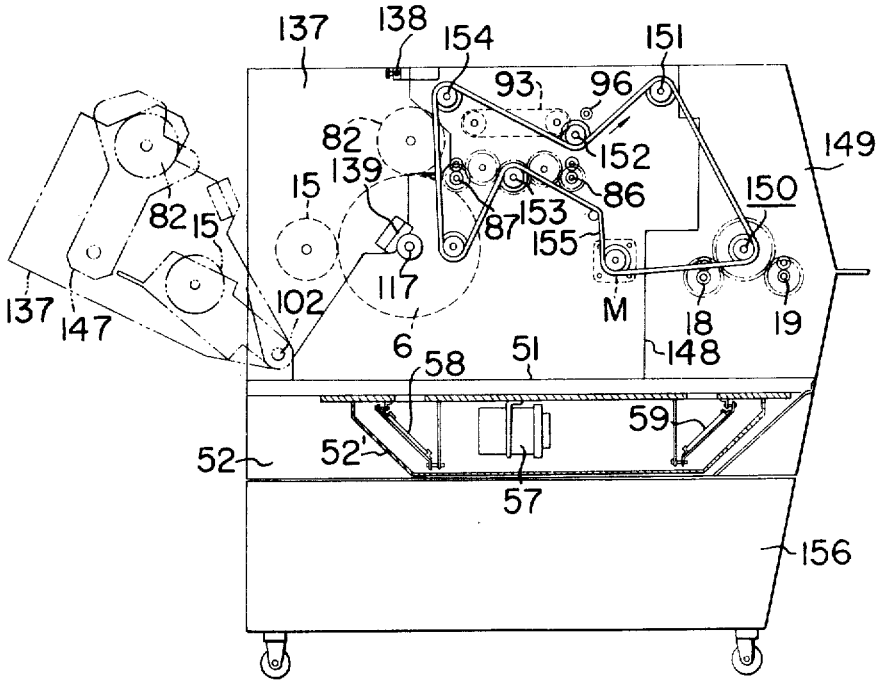
FIG. 2 is a side view thereof illustrating the drive mechanism.

The optical exposure system in the instant embodiment is best shown in FIGS. 2 and 3. A dust-proof chamber 52 is disposed below a bottom plate 51 of the housing. Openings 53 and 54 which are optically communicated to the original illumination section and the contemporaneous corona-discharge-exposure station 9 are formed through the bottom plate 51. Transparent members 55 and 56 are placed in position by means of retaining members 55-1 and 56-1 respectively upon the bottom plate 51 so as to close the openings 53 and 54 in an air-tight manner. A lens mount 57, reflecting mirrors 58 and 59 and other optical elements in the optical exposure system are fixed or mounted upon a plate 200 which in turn is securely fixed to the bottom plate 51 by means of retaining members 201 and 202. The lens mount 57 and the reflecting mirrors 58 and 59 are mounted by retaining members 57-1, 58-1, 58-2, 58-3, 59-1, 59-2 and 59-3. An inner wall 52' is installed for protecting the optical exposure system within the dust-proof chamber 52. The light or radiation image of the original 0 placed in the exposure section 26, 27 in the original transporting station is projected upon the rotary drum 6 through the reflecting mirror 58, the projection lens 57, the reflecting mirror 59 and the contemporaneous corona-discharge-exposure station 9. Because of the provision of the transparent sealing members 55 and 56, the original transporting station, the optical exposure system and the contemporaneous corona-discharge-exposure station are completely separated from each other so contamination of the lens (within the mount 57), the reflecting mirrors 58 and 59 and other optical elements by toner and the like is positively prevented. Furthermore, there is a remarkable advantage that the optical adjustment in assembly and the periodic cleaning and maintenance of the optical system is much facilitated.

Electrophotographic Processing Station

Upon actuation of the control switch MS-1 by the original 0, the photosensitive drum assembly (to be referred to as "rotary drum 6" hereinafter for brevity) starts rotation. The primary charger 8, the secondary charger 60 and the tertiary charger 12 are arranged as described hereinabove and at the position of the secondary charger 60, the corona discharge is applied to the rotary drum 6 contemporaneously when the light or radiation image of the original is projected thereon, thereby forming an electrostatic latent image upon the photosensitive member 7 upon the rotary drum 6. Thereafter, the latent image is uniformly illuminated by the fluorescent lamp 10, thereby increasing the contrast of the electrostatic latent image. The latent image is developed by the developing station which will be described in more detail hereinafter with reference to FIGS. 3, and 9 to 14.

Developing Station

Figure 9:
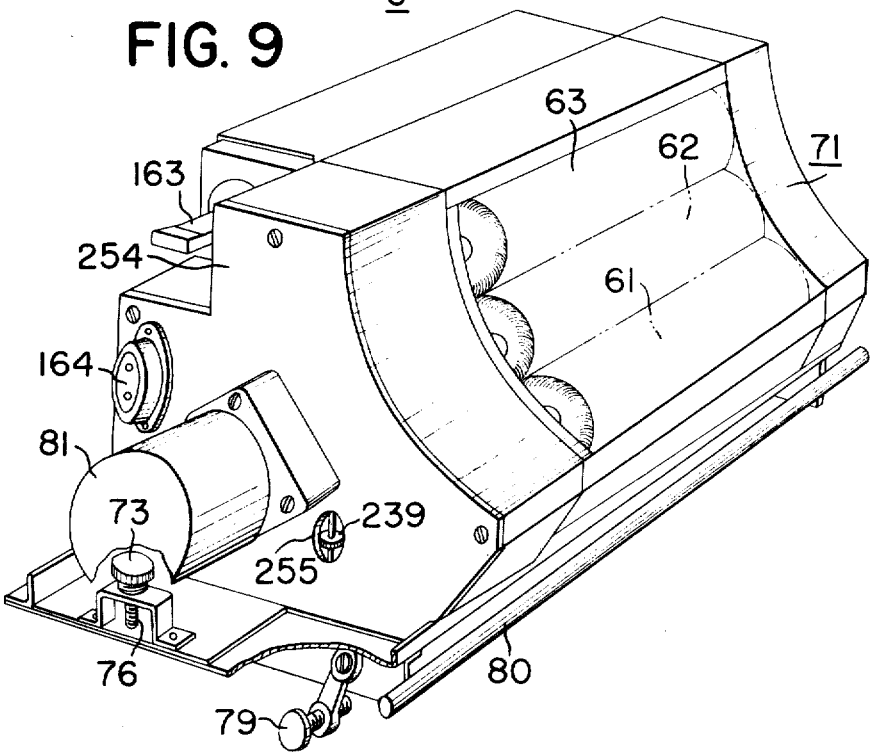
FIG. 9 is a perspective view of a developing station or device.
Figure 10:
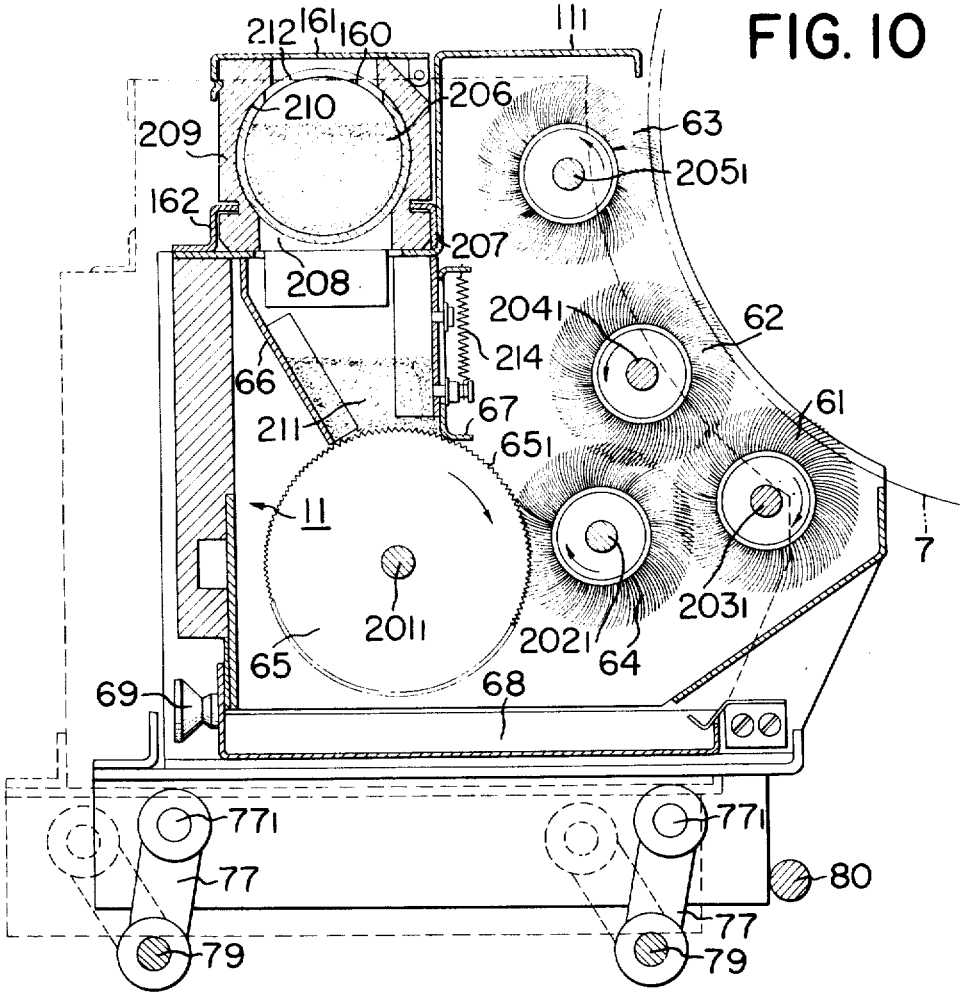
FIG. 10 is a sectional view thereof.

Developing station generally designated by 11 comprises a toner supply roller 65 for continuously supplying the toner in a predetermined quantity, a toner transfer roller 64, first and second developing rollers 61 and 62 and a fog preventing roller 63 as best shown in FIG. 10. The rollers 61, 62 and 63 have furs of rabbits, badger, etc. affixed thereto and rotate about their shafts 203-1, 204-1 and 205-1 respectively. The rollers 65, 64 rotate about shaft 201-1 and 202-1 respectively. These shafts 201-1 to 205-1 are of course journalled by the side walls of the developing station 11. A developer supply unit 206 is inserted in position through guides 162 fixed to the developing station 11. The developer supply unit 206 includes an outer casing 209 having an opening 208 formed through its bottom and a cylindrical inner casing 210 rotatably supported within the developer supply unit 206. The inner casing 210 has a supply port 212 having the dimensions corresponding to the supply port 208 formed through the outer casing. The inner casing 210 is normally so positioned that its supply port 212 is facing upwardly (See FIG. 10). As best shown in FIG. 9, a knob 163 is integrally formed with the inner casing 210 and when this knob 163 is rotated through a suitable angle, the inner casing 210 is rotated so that the developer therein may be dropped into a hopper 66 through the supply port 212. The hopper 66 is interposed between the bottom of the cylindrical inner casing 210 and the supply roller 65, which has recessed or knurled surface 65-1 for retaining the developer dropped from the hopper 66. A weighing or measuring member or doctor blade 67 is biased toward the feed roller 65 by a spring 214 so that the developer carried by the feed roller 65 may be always supplied in uniform quantity. A tray or sump 68 is provided for receiving the developer dropped from the rollers 65, 64 and 61. The tray 68 may be drawn out of the developing station 11 by a knob 69 so that the accumulated toner may be used again. Reference numeral 207 designates a guide.

The developer or toner dropped from the hopper 66 and retained in the recesses 65-1 of the feed roller 65 is scraped by the doctor blade 67 so that only a predetermined amount of the developer or toner is carried and transferred to the transfer brush 64 from which the developer or toner is transferred to the first developing fur brush 61 and then to the second developing fur brush 62, whereby the electrostatic latent image upon the rotary drum 6 may be developed into a visible image.

The excess toner adhered to the rotary drum may be removed by the fog preventive brush 63 and dropped upon the developing brush 62 and the toner transfer brush 64 so that the toner may be used again for development. The toner dropped from the roller 65 and the brush 64 are accumulated in the tray 68 as described hereinabove. The image developed may be further improved when a bias voltage is applied to the developing fur brushes 61 and 62 and the fog preventive brush 63. More specifically a negative potential from 0 to −2,000V is applied to the developing fur brushes 61 and 62 when a positive electrostatic latent image is to be developed and a positive potential from 0 to 2,000V is applied to the fog preventive brush 63. The toner may be suitably supplied into the hopper 66 from the toner supply unit or cartridge 206 by rotating the knob 163 as described hereinabove.

Figure 11:
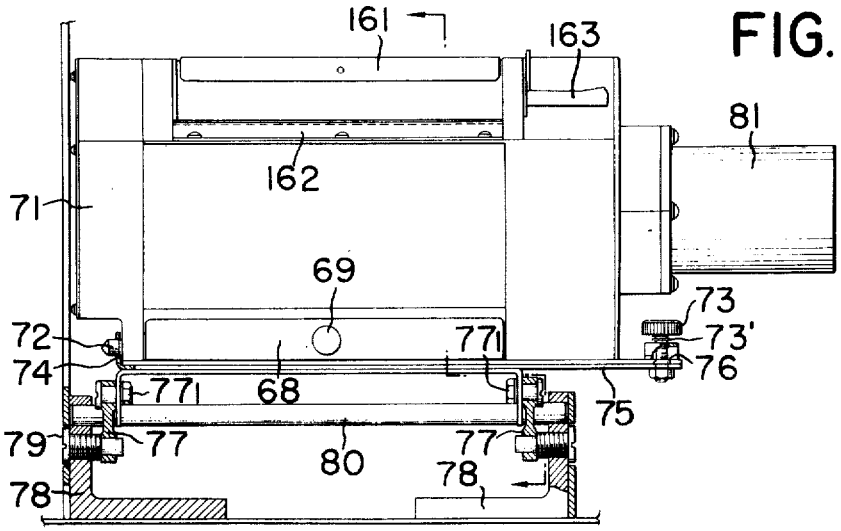
FIG. 11 is a view looking from the left in FIG. 9.
Figure 12:
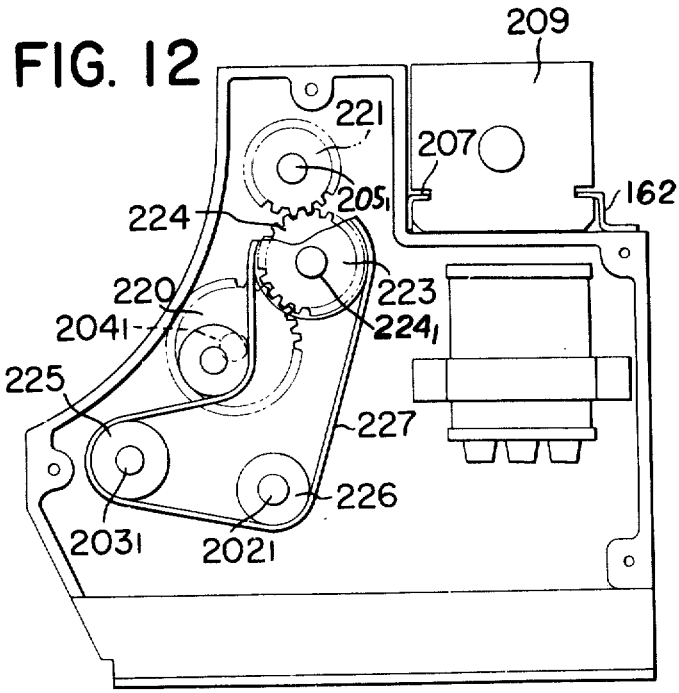
FIG. 12 is a view illustrating a brush roller driving system of the developing station of FIG. 9.

The developing station 11 in accordance with the present invention is so arranged that the station may be moved toward and away from the rotary drum 6. This will be described in more detail hereinafter with particular reference to FIGS. 10 and 11. A retaining pin 72 and a retaining knob 73 are fixed to a casing 71 of the developing station 11 as shown in FIG. 11 in such a manner that the retaining pin 72 is fitted into an engaging hole 74 formed through a support 75 while the retaining knob 73 is engaged with a screw 76 of the support 75. A lever 77 is rotatably fixed to the support through a shaft 79. The support 75 as well as the casing 71 are vertically moved in *parallel with each other by the levers 77 whereby the developing* station 11 is moved toward and away from the rotary drum 6. The developing station 11 is detachably mounted upon the support 75 in a simple manner. A stop 80 is provided for limiting the forward stroke of the developing station and the feed roller, transfer brushes, developing brushes and fog preventive brush are driven by a motor 81.

Figure 13:
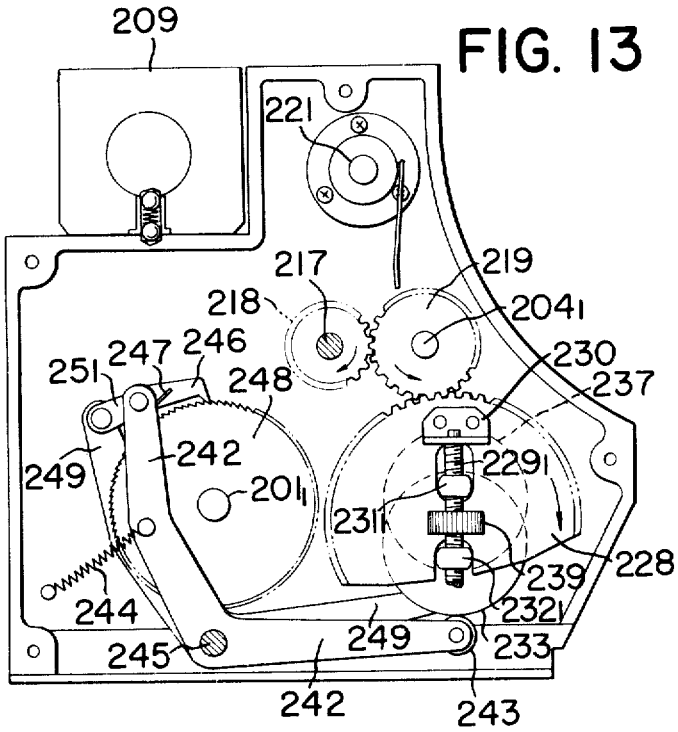
FIG. 13 is a view illustrating a toner feed roller drive system of the developing station of FIG. 9.

The driving system of the developing station 11 will be described in more detail hereinafter. The power source is the motor 81 (See FIG. 9). Referring to FIG. 13, a gear 218 carried by a shaft 217 of the motor 81 is in mesh with a gear 219 carried by the shaft 204-1 so as to drive the second developing brush 62. A gear 220 (See FIG. 12) carried by the second developing brush shaft 204-1 is in mesh with an intermediate gear 223 which in turn is in mesh with a gear 221 carried by a rotary shaft 205-1 of the fog preventive brush 63, thereby the latter is driven. A chain 227 is trained around a sprocket wheel 224 carried by the shaft 224-1, and a sprocket wheels 225 and 226 carried by the shafts 203-1 and 202-1 respectively of the first developing brush 61 and the transfer brush 64, whereby the brushes [62] *61* and 64 are driven.

Figure 14:
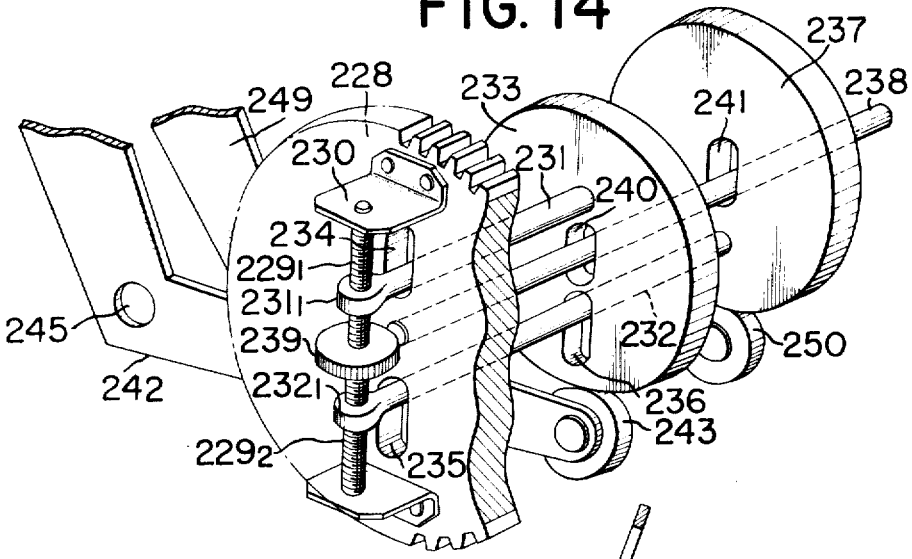
FIG. 14 is a fragmentary perspective view, on enlarged scale of the toner feed roller drive system thereof.

Next the toner feed roller 65 driving system as well as the mechanism for adjusting the feed will be described with reference to FIGS. 13 and 14. A gear 228 is in mesh with the gear 219 which in turn is in mesh with the gear 218 carried by the motor shaft 217. Cams 233 and 237 are arranged so as to rotate in [unision] *unison* with the rotation of a shaft 238 carrying the gear 228, but their cam profiles are out of phase by 180°. Cam followers 243 and 250 for the cams 233 and 237 are carried by levers 242 and 249 respectively. Ratchet pawls 246 and 251 are carried by the levers 242 and 249, and the pawl 246 is biased by a spring 247 so as to normally engage with a ratchet wheel 248. Return spring 244 are provided for the levers 242 and 249.

Next the mechanism for driving the cams 233 and 237 upon rotation of the shaft 238 which in turn is drivingly coupled to the motor 81 will be described. Elongated slots 240 and 241 are formed through the cams 233 and 237 so as to loosely fit the shaft 238 therethrough. The cams 233 and 237 are provided with adjustment arms 231 and 232 respectively extending through elongated slots 234 and 235 formed through the gear 228. A threaded rod consisting of two parts 229-1 and 229-2 is extended between a pair of spaced apart bracket-like members 230 which in turn are fixed to the gear 228 by [menas] *means* of screws or the like. A knob 239 is fixed to the threaded rod (229-1 and -2) so as to extend outwardly through a hole 255 (see FIG. 9) formed through a cover 254. By rotating the knob 239 in either direction, the adjustment arms 231 and 232 may be moved toward or away from the shaft 238 [ao] *so* that the eccentricity of the cams 233 and 237 may be varied accordingly.

Upon rotation of the motor 81, the gear 228 is rotated so that the cams 233 and 237 are rotated in unison therewith. Therefore, the levers 242 and 249 connected to the cam followers 243 and 250 are caused to alternately be oscillated so that the pawls 246 and 251 alternately cause the ratchet wheel 248 and consequently the shaft 201-1 *to rotate*. Subsequently, the feed roller 65 is continuously driven and the toner is supplied. The [rotaiton] *rotation* of the ratchet wheel 248 which is associated with the toner supply quantity is in proportion to the strokes of the ratchet pawls 246 and 251. Therefore strokes of these ratchet pawls 246 and 251 must be adjusted with respect to one rotation of the cams 233 and 237 and the gear 228. For this purpose, the knob 239 extending from the hole 255 of the cover 254 (See FIG. 9) is for example rotated in the right direction, the adjustment arms 231 and 232 are moved away from the shaft 238 thereby increasing the eccentricity of the cams 233 and 237. Consequently, the strokes of the levers 242 and 249 and the ratchet pawls 246 amd 251 with respect to one rotation of the gear 228 are increased, whereby the toner supply quantity is accordingly increased. Thus, a desired toner supply amount may be suitably adjusted by rotating the knob 239 in either direction.

The fur brush developing process described in connection with the instant embodiment is advantageous because the toner may be continuously applied to the rotary drum for development of an electrostatic latent image and the fog formation can be effectively prevented. Furthermore, the toner supply quantity may be suitably adjustable. It will be understood that instead of the fur brush developing process described hereinabove, the magnet brush developing process may be also employed.

Transfer Sheet Feeding Station Image Transfer Station and Fixing Station

The developed image upon the rotary drum should be transferred to a transfer paper. This will be described in more detail hereinafter. Referring to FIG. 3, 83 designates a transfer sheet stand; P, a transfer paper; 84, a feed roller; 84-1, a belt; and 85, a roller drivingly coupled to a power source not shown. In response to a signal from a control unit 30 shown in FIG. 7, transfer papers are fed one by one through a pair of guide plates 88-1 and 88-2, a pair of feed rollers 86; a second pair of feed rollers 87 and guide plates 88-3 and 88-4 toward a transfer drum 82 made of a conductive rubber and grounded. The transfer station is best shown in FIGS. 3 and 8. The transfer drum 82 is slightly longer than the rotary drum in the axial direction. Pulleys 91-1, 91-2 and 91-3 around which is trained a belt 90 are disposed adjacent to the transfer drum 82 as shown in FIG. 3. One of the shafts of the pulleys 91-1, 91-2 or 91-3 is drivingly coupled to a power source so that the transfer paper to which is transferred the image from the rotary drum 6 is advanced by the transfer drum 82 and the belt 90. A separation pawl 92 is in light contact with the transfer drum 82.

The fixing station includes a normally driven wire mesh belt 93, driving rollers 93-1 and 93-2, an infrared lamp 94, and a reflector 95, but it will be understood that the arrangement of the fixing station is not limited to the above described arrangement. The fixing station is always maintained at a predetermined temperature so that the toner image transferred to the transfer sheet may be fused and fixed thereto, whereby the image is permanently recorded. Reference numeral 96 designates discharge rollers; 98, guides 97, a pair of discharge rollers; 4, the outlet; 5, the copy receiver and 5-1, a copy receiver retaining member.

Figure 7:
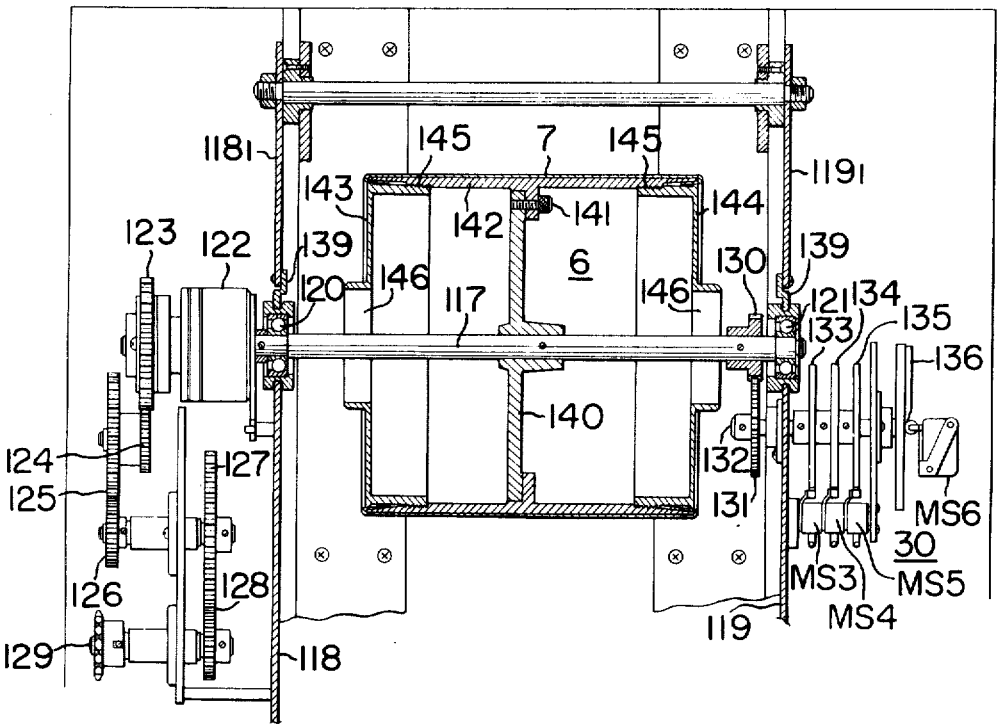
FIG. 7 is a longitudinal sectional view of a photosensitive drum used in the present invention.
Figure 8:
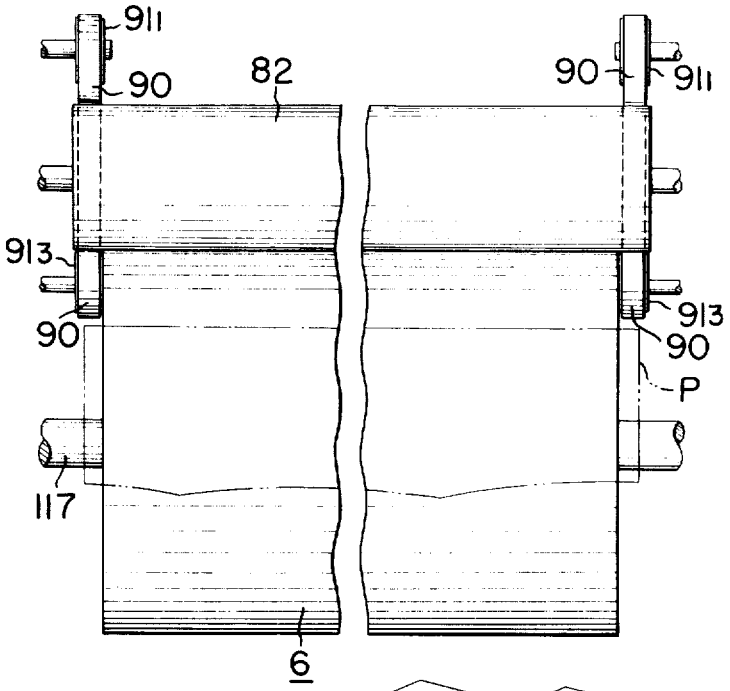
FIG. 8 is a front view illustrating a transfer sheet guide mechanism.

In response to a signal from the control unit 30 shown in FIG. 7 which is controlled by the control switch MS-1, the feed roller 84 is rotated so that the transfer sheets are advanced one by one. The transfer sheet is further transported by the pair of feed rollers 86, but the pair of feed rollers 87 remain stationary first so that the transfer sheet P is caused to bow as shown by the broken line, but the leading edge of the transfer sheet is aligned with the axis of the pair of feed rollers 87. In response to a signal from the control unit 30, the second pair of feed rollers 87 are driven so that the transfer sheet P is transported into the image transfer station in such a manner that the transfer sheet P may be overlapped upon the image-bearing surface of the rotary drum 6. Thereafter, the transfer sheet P is pressed against the rotary drum 6 by the transfer roller 82, whereby the toner image upon the rotary drum 6 may be transferred to the transfer sheet P. Thereafter, the side edges of the transfer sheet P are held between the transfer drum 82 and the belt 90 wrapped around the transfer drum 82 substantially through 180° at one or both side edge portions of the transfer drum 82 which is longer in the axial direction than the rotary drum 6. The transfer sheet P being transported is separated from the transfer drum 82 by the separation pawl 92 so as to be directed into the fixing station, whose temperature is maintained at a predetermined level by the infrared lamp 94. Consequently, the toner image transfer to the transfer sheet P is fused and fixed for permanent recording. Thereafter, the copy or transfer sheet P is discharged through the outlet 4 into [his] *the* copy receiver 5.

Cleaning Station

Figure 16:
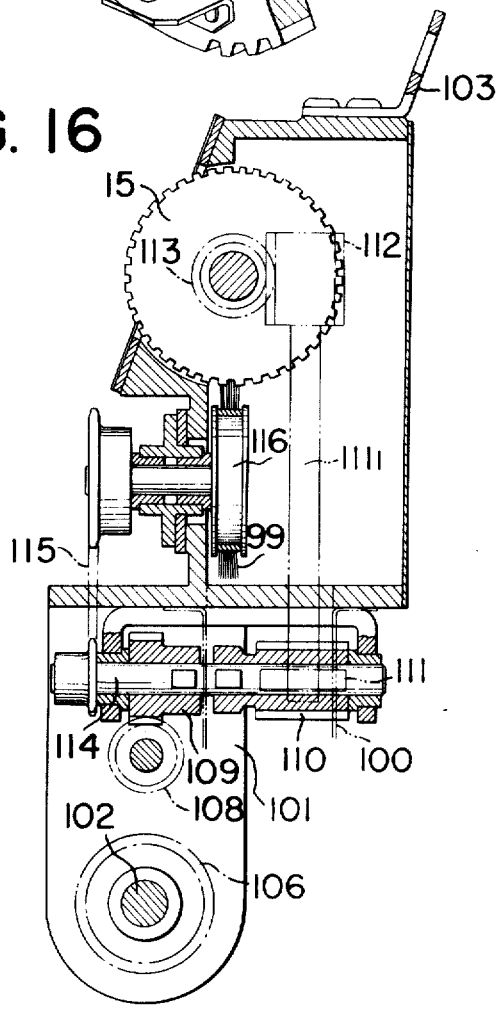
FIG. 16 is a transverse sectional view thereof.
Figure 15:
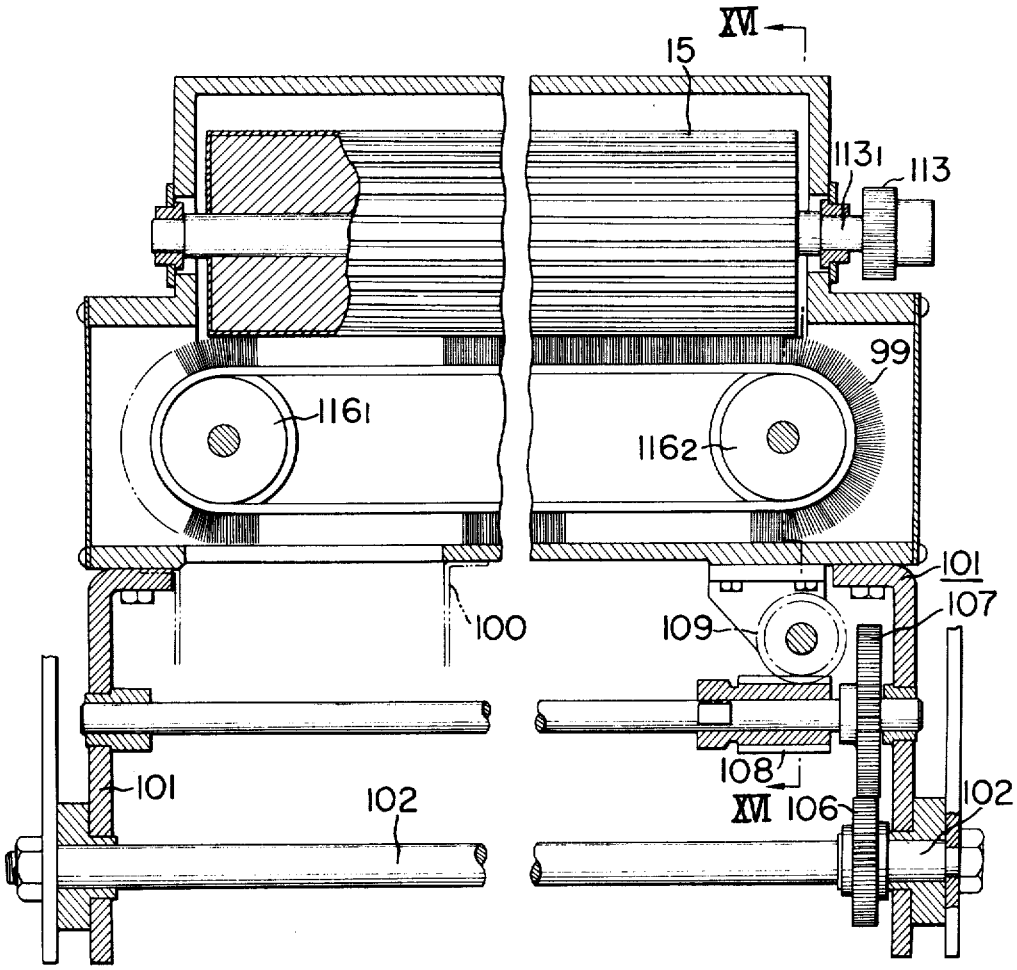
FIG. 15 is a longitudinal sectional view of a cleaning station.

The residual toner still remaining upon the rotary drum 6 must be removed in the cleaning station 14 best shown in FIGS. 3, 15 and 16. The cleaning roller 15 preferably has a knurled surface and may be made of rubber, etc. Reference numeral 99 designates a belt-shaped brush and 100, a toner containing bag or box. By means of a cleaning station retaining leg 102, the cleaning station 14 is rotatably fixed to the machine casing. An ear 103 extending from the cleaning station 14 is loosely fitted over a threaded pin 104 extending from the machine frame 104' and by means of a spring 105, the cleaning roller 15 may be pressed against the rotary drum 6 with a predetermined pressure. The system for driving the cleaing roller 15 and the belt-shaped brush consists of, as best shown in FIGS. 15 and 16, a gear 106 carried by the shaft 102, a gear 107 in mesh with the gear 106, a gear 108 carried by the same shaft carrying the gear 107, a gear 109 in mesh with the gear 108, a gear 110 carried by the same shaft carrying the gear 109, a gear 111 in mesh with the gear 110 at a right angle, a shaft 111-1 carrying the gear 111, a gear 112 carried by the shaft 111-1, and a gear 113 in mesh with the gear 112. The cleaning roller 15 is carried by the shaft 113-1 which carries also the gear 113. A chain 115 is trained around a shaft 114 and a shaft of the belt brush 99. The shaft 114 is driven by a suitable gear train in addition to the above described gears, shafts, etc., so that the belt-shaped brush 99 is driven.

The residual toner upon the rotary drum after the transfer of the toner visible image is wiped off by the knurled cleaning roller 15 and the belt-shaped brush 99 wipes off the toner from the cleaning roller 15. The residual toner is therefore dropped into the reservoir or sump 100.

Other Mechanisms

Next the control unit for the photocopying machine will be described with reference to FIG. 7, in which 117 designates the rotary shaft of the rotary drum 6; 118 and 119, side plates affixed to the machine housing; 120 and 121, bearings; 122, an electromagnetic clutch carried by the end of the shaft 117; 123 [and] *to* 128, gears; and 129, a sprocket wheel shaft. 130 designates a gear carried at the other end of the shaft 117; 131, a gear in mesh with the gear 130; and 132, a cam shaft of the control unit 30. 133 [and] *to* 136 designate cams and MS-3 to MS-6 switches for controlling the photocopying machine.

The shaft 117 of the rotary drum 6 is journalled between the side plates 118 and 119 through the bearings 120 and 121 and the shaft 117 is driven from the shaft 129 through the gear train 123 to 128 and the clutch 122. The cam shaft 132 of the control unit 30 is driven by the shaft 117 through the gear 130 carried thereby and the gear 131 carried by the shaft 132 and in mesh with the gear 130. The electromagnetic clutch 122 is energized in response to the actuation of the control switch MS-1 (See FIGS. 3 and 4) so that the rotary drum 6 and the cam shaft 132 are rotated, thereby controlling the photocopying machine through the cams 133 to 136 and the switches MS-3 to MS-6.

Next means for supporting the rotary drum 6 will be described. The rotary drum 6 must be used for a relatively long time and must be replaced for cleaning. Therefore, the rotary drum is so designed that it may be readily detached from the photocopying machine and may be fabricated in a simple manner. The rear section generally designated by 137 and including the side plates 118 and 119 (See FIG. 7) is so arranged as to be opened as shown by the chain lines in FIG. 2 by rotating it about the shaft 102 (in the instant embodiment used in common with the shaft of the cleaning station) by loosening a locking member 138. Therefore a retaining member 139 for the bearing of the rotary drum is moved away therefrom so that the rotary drum 6 may be detached from the photocopying machine together with the shaft 117, the gears 23 and 130, the electromagnetic clutch 122 and the bearings 120 and 121 from the opening between the side plates 118 and 119.

The rotary drum 6 includes a disc 140, the shaft 117, a drum 142 fixed to the disk 140 by a screw 141 and side plates 143 and 144 screwed to both sides of the drum 142.

The photosensitive member 7 having the insulating film is fixed around the drum 142 with the side edges held between the drum 142 and the side plates 143 and 144 by screw threads 145. Openings 146 formed through the side plates 143 and 144 are made larger than the diameters of the bearings 120, 121, the clutch 122 and the gear 123 so that these parts are not required to be disassembled when the side plates 143 and 144 are attached or detached for replacing the photosensitive member 7. It is seen that adjustment, etc. after replacement of the photosensitive member 7 will not be required, thus facilitating the replacement.

As shown in FIG. 2, a support 147 for the transfer station as well as the cleaning station is fixed to the rear section 137 so that these stations may be detached from the main body of the photocopying machine and the rotary drum 6 is readily detachable as described hereinabove, so that the inspection, repairs and maintenance of the chargers 8, 60 and 12, the whole-surface exposure device 10, the developing station 11, etc. may be much facilitated.

The front section 149 is so arranged as to be drawn forwardly and detached from the main body along the line 148 in FIGS. 2 and 3. The original transporting or circulating station, the transfer sheet feeding station, etc. may be arranged in this section 149 in order to facilitate the inspection, repairs and maintenance of these stations and equipment. To supply the transfer sheet P upon the holder 83, the copy receiver 5 may be opened around its shaft 5-1.

FIG. 2 also illustrates how the above stations are driven. That is, a common belt or chain 155 is used to transmit the power from [the] *a* motor M to the original transporting or circulating shaft 150, the copy discharge [roller] *rollers* 96 and 97 and the conveyor 93 through the shafts 151 and 152; the shaft of the transfer sheet feed rollers 86 and 87 and the shaft 154 of the transfer sheet separating belt 90.

Referring back to FIG, 3, 156 designates an accessory box including an electric power source box 157 below the optical chamber 52, and a transfer sheet box 158.

Around the periphery of the photosensitive drum assembly, are arranged the primary charger, the secondary charger for contemporaneous charging-exposure, the whole-surface exposure device if required, the developing station, the tertiary charger if required, the image transfer station and the cleaning station. On one side of the photosensitive drum assembly are arranged, the original transporting or circulating device and the device for projecting a light or radiation image of an original to be reproduced. Below the sensitized drum assembly is arranged the optical system and above the assembly, the image transfer and fixing station together with the transfer sheet or paper feeding device. Thus, the photocopying machine in accordance with the present invention may be made [conpact] *compact* in size and light in weight. Because of the arrangement of the fixing station or device in the upper section of the photocopying machine, the heat dissipated from the fixing station may be advantageously prevented from being transmitted to other stations, especially the optical system whereby the lenses may be well protected. Furthermore, the optical system is enclosed in the dust-proof chamber so that the contamination of the optical system by the toner, etc. is prevented.

The transfer sheet separating belt is trained around the transfer rubber roller so that when the transfer sheet is advanced along the transfer roller while being held between the transfer roller and the belt, the transfer sheet which is adhered to the rotary drum electrostatically may be securely and smoothly separated from the rotary drum.

The cleaning roller made of rubber, synthetic resins, etc. having a knurled surface if required is used for remove the residual toner from the photosensitive drum assembly and the toner upon the cleaning roller is removed by the belt-like brush moving in the axial direction of the cleaning drum. Thus, the cleaning of the residual toner may be effected by a cleaning device simple in construction and effective in operation.

The developing station is so arranged as to be detachably mounted in the photocopying machine and moved toward and away from the photosensitive drum assembly by a parallel link mechanism, whereby inspection, repairs and maintenance of the developing station are much facilitated.

Because of the fur brush development process employed in the instant embodiment of the present invention, the toner may be supplied continuously for development of an electrostatic latent image and fog may be effectively prevented. The amount of toner supply may be suitably adjusted. This is a remarkable improvement in the electrophotographic development process.

The rear section is so arranged [a] *as* to be openable and to move away from the upper halves of the bearings of the photosensitive drum assembly so that it may be detached from the machine in a simple manner. Furthermore, other stations, devices and equipment arranged around the periphery of the photosensitive drum assembly may be inspected and, repaired in a very simple manner. The transfer roller, the transfer sheet separating belt and the cleaning station are mounted upon the machine frame so that the photosensitive drum assembly may be readily detached and mounted.

The side plates or disks attached to the rotary drum are detachably fixed and a thin photosensitive member is wrapped around the drum with their side edge portions being firmly held between the drum and the side plates or disks. Therefore, the attachment and replacement of the sensitized member around the rotary drum is much facilitated at a less cost.

What is claimed:

1. An electrophotographic copying apparatus comprising in combination: a variable path for the transportation of an original to be reproduced; means for transporting an original over said path; control means for said path and means for detecting the passage of an original both arranged in said path, *said control means including a guide plate for guiding said original to be reproduced, guide plate positioning means adapted to shift said guide plate between first and second positions, cam means controlling operation of said guide plate positioning means and provided with a plurality of spaced pins, and cam driving means operable by signals from said detecting means to act upon said pins and shift said cam means, whereby* said control means [being] *is* adapted to establish a continuous recirculating path in response to a signal generated by said detecting means when the latter first detects an original inserted in said path through an inlet thereto, thereby circulating an original that has been inserted through said path so as to obtain more than one copy from an original that has been inserted, said control means being further adapted to alter said path in response to a signal generated by said detecting means when the latter detects the completion of a predetermined number of circulations of an original in said path, thereby discharging an original that has been circulated; means for illuminating an original as it is being transported by said transporting means for deriving a projectable image therefrom; a photosensitive drum rotatably mounted upon a shaft; means for forming an electrophotographic image on said drum arranged around the periphery of said drum and including an optical system for projecting said projectable image upon said drum; means for feeding image transfer material; means for transferring an image from said drum to transfer material fed by said feeding means; and means for fixing an image on transfer material to which an image has been transferred.

2. An electrophotographic copying apparatus as claimed in claim 1, wherein said means for forming an electrophotographic image comprises charging means, developing means, and cleaning means arranged about the periphery of said drum.

3. An electrophotographic copying apparatus as claimed in claim 1, wherein said drum comprises a photoconductive layer and an insulating layer laminated in the order named upon an underlying base; and said means for forming an electrophotographic image comprises primary voltage application means, contemporaneous secondary-voltage-application-exposure means, developing means, and cleaning means arranged about the periphery of said drum.

4. An electrophotographic copying apparatus as claimed in claim 3, wherein said means for forming an electrophotographic image further comprises third voltage application means arranged about the periphery of said drum.

5. An electrophotographic copying apparatus as claimed in claim 1, wherein said drum comprises a photoconductive layer and an insulating layer laminated in the order named upon an underlying base; and said means for forming an electrophotographic image comprises first voltage application means, contemporaneous secondary-voltage-application-exposure means, whole-surface exposure means, developing means, and cleaning means arranged about the periphery of said drum.

6. An electrophotographic copying apparatus comprising in combination: means for transporting an original to be reproduced; means for illuminating an original as it is being transported by said transporting means for deriving a projectable image therefrom; a photosensitive drum rotatably mounted upon a shaft; means for forming an electrophotographic image on said drum arranged around the periphery of said drum and including means for establishing an electrostatic charge on said drum and an optical system for projecting said projectable image upon said drum; means for feeding image transfer material; means for transferring an image from said drum to transfer material fed by said feeding means comprising a transfer roller in pressure contact with said drum, and a transfer material separating belt trained around an end portion of said transfer roller for overcoming the electrostatic attraction between said drum and image transfer material fed by said feeding means and entraining transfer [meaterial] *material* between said transfer roller and said belt; and means for fixing an image on transfer material to which an image has been transferred.

7. An electrophotographic copying apparatus as claimed in claim 6, wherein said means for forming an electrophotographic image comprises charging means, developing means, and cleaning means arranged about the periphery of said drum.

8. An electrophotographic copying apparatus as claimed in claim 6, wherein said drum comprises a photoconductive layer and an insulating layer laminated in the order named upon an underlying base; and said means for forming an electrophotographic image comprises primary voltage application means, contemporaneous secondary-voltage-application-exposure means, developing means, and cleaning means arranged about the periphery of said drum.

9. An electrophotographic copying apparatus as claimed in claim 8, wherein said means for forming an electrophotographic image further comprises whole-surface exposure means arranged about the periphery of said drum.

10. An electrophotographic copying apparatus as [claim] *claimed* in claim 9, wherein said means for forming an electrophotographic image further comprises third voltage application means arranged about the periphery of said drum.

11. An electrophotographic copying apparatus comprising in combination: means for transporting an original to be reproduced; means for illuminating an original as it is being transported by said transporting means for deriving a projectable image therefrom; a photosensitive drum having a surface on which an image can be formed rotatably mounted upon a shaft; means for forming an electrophotographic image on said surface of said drum arranged around the periphery of said drum comprising charging means, developing means, cleaning means, and an optical system for projecting said projectable image upon said drum; said cleaning means including a rotatably mounted cleaning roller with a longitudinally knurled surface parallel to and in frictional rolling contact with said surface of said drum, and a belt-shaped brush disposed to move in the axial direction of and in contact with said knurled surface of said cleaning roller for cleaning said knurled surface; means for feeding image transfer material; means for transferring an image from said drum to transfer material fed by said feeding means; and means for fixing an image on transfer material to which an image has been transferred.

12. An electrophotographic copying apparatus as claimed in claim 11, wherein said drum comprises a photoconductive layer and an insulating layer laminated in the order named upon an underlying base; and said charging means comprises primary voltage application means, and contemporaneous secondary-voltage-application-exposure means arranged about the periphery of said drum.

13. An electrophotographic apparatus as claimed in claim 12, wherein said means for forming an electrographic image further comprises whole-surface exposure means arranged about the periphery of said drum.

14. An electrophotographic copying apparatus as claimed in claim 13, wherein said means for forming an electrophotographic image further comprises third voltage application means arranged about the periphery of said drum.

15. An electrophotographic copying apparatus comprising in combination: means for transporting an original to be reproduced; means for illuminating an original as it is being transported by said transporting means for deriving a projectable image therefrom; a photosensitive drum rotatably mounted upon a shaft; means for forming an electrophotograhic image on said drum arranged around the periphery of said drum comprising charging means, self-contained developing means within a casing, cleaning means, and an optical system for projecting said projectable image upon said drum; a support; said casing of said developing means being detachably mounted on said support, said support being movably mounted adjacent said drum for selectively moving said casing to move said developing means in parallel relationship toward and away from said drum into and out of engagement therewith; means for feeding image transfer material; means for transferring an image from said drum to transfer material fed by said feeding means; and means for fixing an image on transfer material to which an image has been transferred.

16. An electrophotographic copying apparatus as claimed in claim 15, wherein said drum comprises a photoconductive layer and an insulating layer laminated in the order named upon an underlying base; and said charging means comprises primary voltage application means, and contemporaneous secondary-voltage-application-exposure means arranged about the periphery of said drum.

17. An electrophotographic apparatus as claimed in claim 16, wherein said means for forming an electrophotographic image further comprises whole-surface exposure means arranged about the periphery of said drum.

18. An electrophotographic copying apparatus as claimed in claim 17, wherein said charging means further comprises third voltage application means arranged about the periphery of said drum.

19. An electrophotographic copying apparatus comprising in combination: means for transporting an original to be reproduced; means for illuminating an original as it is being transported by said transporting means for deriving a projectable image therefrom; a photosensitive drum rotatably mounted upon a shaft spaced from said illuminating means; means for forming an electrophotographic image on said drum arranged around the periphery of said drum and including an optical system for projecting said projectable image upon said drum; a dustproof chamber extending from a point adjacent said means for illuminating the original to a point adjacent said drum with all of the optically active elements in said optical system removably disposed as an independent assembly totally within said chamber; means for feeding image transfer material; means for transferring an image from said drum to transfer material fed by said feeding means; and means for fixing an image on transfer material to which an image has been transferred.

20. An electrophotographic copying apparatus as claimed in claim 19, wherein said dust-proof chamber is provided with transparent means [to] *at* opposite ends of the optical path from said means for illuminating the original to said drum.

21. An electrophotographic copying apparatus as claimed in claim 19, wherein said means for forming an electrophotographic image comprises charging means, developing means, and cleaning means arranged about the periphery of said drum.

22. An electrophotographic copying apparatus as claimed in claim 19, wherein said drum comprises a photoconductive layer and an insulating layer laminated in the order named upon an underlying base; and said means for forming an electrophotographic image comprises primary voltage application means, contemporaneous primary secondary-voltage-application-exposure means, developing means, and cleaning means, arranged about the periphery of said drum.

23. An electrophotograhic copying apparatus as claimed in claim 22, wherein said means for forming an electrophotographic image further comprises whole-surface exposure means arranged about the periphery of said drum.

24. An electrophotographic copying apparatus as claimed in claim 23, wherein said means for forming an electrophotographic image further comprises third voltage application means arranged about the periphery of said drum.

25. An electrophotographic copying apparatus as claimed in claim 19, wherein said dust-proof chamber is disposed below said drum; and wherein said means for feeding image transfer material, said means for transferring an image, and said means for fixing an image are all disposed upwardly of said drum.

26. An electrophotographic copying apparatus as claimed in claim 25 wherein said means for forming an electrophotographic image comprises charging means, developing means, and cleaning means arranged about the periphery of said drum.

27. An electrophotographic copying apparatus as claimed in claim 25, wherein said drum comprises a photoconductive layer and an insulating layer laminated in the order named upon an underlying base; and said means for forming an electrophotographic image comprises primary voltage application means, contemporaneous secondary-voltage-application-exposure means, developing means, and cleaning means arranged about the periphery of said drum.

28. An electrophotographic copying apparatus according to claim 27, wherein means are provided for energizing said primary voltage application means with D. C. voltage of one polarity; and means are provided for energizing said contemporaneous secondary-voltage-application-exposure means with D. C. voltage opposite in polarity to said one polarity.

29. An electrophotographic copying apparatus according to claim 27, wherein means are provided for energizing said primary voltage application means with D. C. voltage; and means are provided for energizing said contemporaneous secondary-voltage-application-exposure means with A. C. voltage.

30. An electrophotographic copying apparatus as claimed in claim 25, wherein said drum comprises a photoconductive layer and an insulating layer laminated in the order named upon an underlying base; and said means for forming an electrophotographic image comprises first voltage application means, contemporaneous secondary-voltage-application-exposure means, whole-surface means, developing means, and cleaning means arranged about the periphery of said drum.

31. An electrophotographic copying apparatus comprising in combination: a center structural frame assembly; a rear structural frame assembly; said rear frame assembly being movably mounted adjacent said center frame assembly for selective movement toward or away from said center frame assembly; bearing members; a shaft journaled for rotation in said bearing members; a photosensitive drum fixedly mounted on said shaft for rotation with said shaft; means secured to said shaft for communicating driving motion thereto; said bearing members being supported by said center frame assembly and secured against removal therefrom solely by the engagement of said rear frame assembly therewith when the latter is positioned toward said center frame assembly whereby upon movement of said rear frame assembly away from said center frame assembly said drum is removable along with said shaft, said bearing members, and said means for communicating driving motion; means for transporting an original to be reproduced; means for illuminating an original as it is being transported by said transporting means for deriving a projectable image therefrom; means for forming an electrophotographic image on said drum arranged around the periphery of said drum and including an optical system for projecting said projectable image upon said drum; means for feeding image transfer material; means for transferring an image from said drum to transfer material fed by said feeding means; and means for fixing an image on transfer material to which an image has been transferred.

32. An electrophotographic copying apparatus as claimed in claim 31, wherein said means for forming an electrophotographic image comprises charging means, developing means, and cleaning means arranged about the periphery of said drum.

33. An electrophotographic copying apparatus as claimed in claim 32, wherein both said means for transferring an image from said drum to said transfer material and said cleaning means are mounted on said rear frame assembly.

34. An electrophotographic copying apparatus as claimed in claim 31, wherein said drum comprises a photoconductive layer and an insulating layer laminated in the order named upon an underlying base; and said means for forming an electrophotographic image comprises primary voltage application means, contemporaneous secondary-voltage-application-exposure means, developing means, and cleaning means arranged about the periphery of said drum.

35. An electrophotographic copying apparatus as claimed in claim 34, wherein said means for forming an electrophotographic image further comprises whole-surface exposure means arranged about the periphery of said drum.

36. An electrophotographic copying apparatus as claimed in claim 35, wherein said means for forming an electrophotographic image further comprises third voltage application means arranged about the periphery of said drum.

37. An electrophotographic copying apparatus comprising in combination: means for transporting an original to be reproduced; means for illuminating an original as it is being transported by said transporting means for deriving a projectable image therefrom: a photosensitive drum rotatably mounted upon a shaft; means for forming an electrophotographic image on said drum arranged around the periphery of said drum and including an optical system for projecting said projectable image upon said drum; means for feeding image transfer material; means for transferring an image from said drum to transfer material fed by said feeding means; and means for fixing an image on transfer material to which an image has been [transerrred;] *transferred;* said drum comprising a disk secured to said shaft intermediate the ends thereof, a hollow cylinder surrounding said disk and secured thereto concentric with said shaft, side plates detachably secured in opposite ends of said hollow cylinder, and a sheet-like photosensitive member having an insulating layer at the outer surface thereof wrapped around said hollow cylinder with side edge portions of said photosensitive member secured between said cylinder and said side plates.

38. An electrophotographic copying apparatus as claimed in claim 37, wherein said photosensitive member comprises a photoconductive layer laminated between said insulating layer and an underlying base; and said means for forming an electrophotographic image comprises primary voltage application means, contemporaneous secondary-voltage-application-exposure means, developing means, and cleaning means arranged about the periphery of said drum.

39. An electrophotographic copying apparatus as claimed in claim 38, wherein said means for forming an electrophotographic image further comprises whole-surface exposure means arranged about the periphery of said drum.

40. An electrophotographic copying apparatus as claimed in claim 39, wherein said means for forming an electrophotographic image further comprises third voltage application means arranged about the periphery of said drum.

41. An electrophotographic copying apparatus [comprisisng] *comprising* in combination: means for transporting an original to be reproduced; means for illuminating an original as it is being transported by said transporting means for deriving a projectable image therefrom; a photosensitive drum rotatably mounted upon a shaft, said drum comprising a photoconductive layer and a nonphotosensitive insulating layer laminated in the order named upon an underlying base; means for forming an electrophotographic image on said drum arranged around the periphery of said drum comprising a primary voltage application means, contemporaneous secondary-voltage-application-exposure means, whole-surface exposure means, third voltage application means, developing means, cleaning means and an optical system for projecting [and] *said* projectable image upon said drum; said developing means including a hopper for holding developer, a feed roller with a roughened surface mounted for rotation adjacent an outlet of said hopper, a plurality of developing rollers rotatably mounted for contacting said photosensitive drum and transferring developer thereto, a fur brush mounted between said feed roller and said developing rollers for transferring developer from said feed roller to said developing rollers, a fog preventing roller mounted for engagement with the surface of said drum, and means for continuously rotating said feed roller to receive developer from said hopper on its roughened surface and transfer said developer at a predetermined rate to said fur brush; means for feeding image transfer material; means for transferring an image from said drum to transfer material fed by said feeding means; and means for fixing an image on transfer material to which an image has been transferred.

42. An electrophotographic copying apparatus comprising in combination: means for transporting an original to be reproduced; means for illuminating an original as it is being transported by said transporting means for deriving a projectable image therefrom; a photosensitive drum rotatably mounted upon a shaft; means for forming an electrophotographic image on said drum arranged around the periphery of said drum comprising charging means, developing means, cleaning means, and an optical system for projecting said projectable image upon said drum; said developing means including a hopper for holding developer, a feed roller with a roughened surface mounted for rotation adjacent an outlet of said hopper, developing member for transferring developer to said photosensitive drum, and means for continuously rotating said feed roller to receive developer from said hopper on its roughened surface and transfer [and] *said* developer at a predetermined rate to said developing member, said means for rotating said feed roller comprising a pair of cams rotatable in 180° out-of-phase relationship with each other, a cam follower in engagement with each of said cams, a ratchet pawl under the control of each of said cam followers, and a ratchet wheel joined to said feed roller and engaged by said ratchet pawls whereby upon rotation of said cams said pawls are alternately reciprocated imparting continuous rotational movement to said ratchet wheel and consequently to said feed roller; means for feeding image transfer material; means for transferring an image from said drum to transfer material fed by said feeding means; and means for fixing an image on transfer material to which an image has been transferred.

43. An electrophotographic copying apparatus as claimed in claim 42, wherein said drum comprises a photoconductive layer and an insulating layer laminated in order named upon an underlying base; and said charging means comprises primary voltage application means, and contemporaneous secondary-voltage-application-exposure means arranged about the periphery of said drum.

44. An electrophotographic copying apparatus as claimed in claim 43, wherein said means for forming an electrophotographic image further comprises a whole-surface exposure means arranged about the periphery of said drum.

45. An electrophotographic copying apparatus as claimed in claim 44, wherein said means for forming an electrophotographic image further comprises third voltage application means arranged about the periphery of said drum.

[46. An electrophotographic copying apparatus comprising in combination: means for transporting an original to be reproduced; means for illuminating an original as it is being transported by said transporting means for deriving a projectable image therefrom; a photosensitive drum rotatably mounted upon a shaft, said drum comprising a photoconductive layer and a non-sensitive [inslulating] *insulating* layer laminated in the order named upon an underlying base; means for forming an electrophotographic image on said drum arranged around said drum for projecting said projectable image upon said drum, said means for forming an electrophotographic image comprising first voltage application means, contemporaneous secondary-voltage-application-exposure means, whole surface exposure means, developing means, tertiary voltage application means, and cleaning means arranged about the periphery of said drum; means for feeding image transfer material; means for transferring an image from said drum to transfer material fed by said feeding means; and means for fixing an image on transfer material to which an image has been transferred, said three last mentioned means all being disposed upwardly of said drum.]

*47. An electrophotographic copying apparatus comprising in combination; means for supporting an original to be reproduced, means for illuminating the original supported by said supporting means to derive a projectable image therefrom, a photosensitive drum mounted for rotation about a central axis therethrough, means for forming on said drum an electrophotographic image of said original*

*and including means for establishing an electrostatic charge on said drum, and an optical system for projecting said projectable image upon said drum, means for applying developer toner to said electrophotographic image on said drum to form a toner image thereof, means for feeding image transfer material to contact the toner image on said drum, means for transferring the toner image from said drum to the transfer material fed by said feeding means, and separating means for separating said transfer material from said drum, said separating means including roller means and a separator member mounted such that a portion thereof extends along a portion of said roller means, said separator member and said roller means being movable together and being positioned relatively to said drum to engage said transfer material and hold same therebetween positively to withdraw said transfer material from said drum.*

*48. An electrophotographic copying apparatus according to claim 47, wherein said separator member is a belt, a portion of which extends along a portion of the circumference of said roller means.*

*49. Apparatus according to claim 47, wherein said roller means is disposed adjacent at least one end of said transfer means.*

*50. Apparatus according to claim 47, wherein said transfer means include a transfer roller positioned relatively to said drum to transfer the image formed upon said drum to the transfer material.*

*51. Apparatus according to claim 50, further comprising a pawl contacting said transfer roller for separating the transfer material from said transfer roller.*

*52. Apparatus according to claim 50, wherein said transfer roller and said roller means are integrally formed.*

*53. Apparatus according to claim 48, wherein said belt is an endless belt reeved around a plurality of pulleys.*

*54. An electrophotographic copying apparatus comprising in combination; means for supporting an original to be reproduced, means for illuminating an original as it is supported by said supporting means, for deriving a projectable image therefrom, a photosensitive drum mounted for rotation about a central axis therethrough, means for forming an electrophotographic image on said drum, and an optical system for projecting said projectable image upon said drum, means for feeding image transfer material along a path contacting a portion of the circumference of said drum for rotation therewith, means for transferring an image from said drum to the transfer material where said transfer material contacts said drum, and transfer material separating means including an elongate member extending along a marginal length of the surface of said transfer material contacting said drum, said elongate member curving away from the surface of said drum after completion of transfer of the image from said drum to said transfer material and means drawing said transfer material from the surface of said drum.*

* * * * *